(12) United States Patent
Uchimura et al.

(10) Patent No.: US 11,403,471 B2
(45) Date of Patent: Aug. 2, 2022

(54) DELIVERY MONITORING DEVICE, DELIVERY MANAGEMENT METHOD, RECORDING MEDIUM

(71) Applicant: NEC Corporation, Tokyo (JP)

(72) Inventors: Jun Uchimura, Tokyo (JP); Hiroshi Takahashi, Kawasaki (JP); Masato Watanabe, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,660

(22) PCT Filed: Mar. 15, 2019

(86) PCT No.: PCT/JP2019/010903
§ 371 (c)(1),
(2) Date: Sep. 25, 2020

(87) PCT Pub. No.: WO2019/188434
PCT Pub. Date: Oct. 3, 2019

(65) Prior Publication Data
US 2021/0124882 A1    Apr. 29, 2021

(30) Foreign Application Priority Data

Mar. 29, 2018   (JP) .............................. JP2018-063702

(51) Int. Cl.
*G06K 7/10*        (2006.01)
*G06K 19/07*       (2006.01)
(Continued)

(52) U.S. Cl.
CPC ..... *G06K 7/10099* (2013.01); *G06K 19/0723* (2013.01); *G06Q 50/28* (2013.01); *G06K 2007/10504* (2013.01); *H04W 4/029* (2018.02)

(58) Field of Classification Search
CPC combination set(s) only.
See application file for complete search history.

(56) References Cited

U.S. PATENT DOCUMENTS

2005/0258955 A1* 11/2005 Gloekler ................ G06Q 50/30
                                                   340/539.13
2009/0195361 A1*  8/2009 Smith .................. H04B 7/0615
                                                      340/10.1

FOREIGN PATENT DOCUMENTS

JP        2001-328713 A     11/2001
JP        2008-189391 A      8/2008
(Continued)

OTHER PUBLICATIONS

E. Onieva, et al., "Improvement of Drug Delivery Routes Through the Adoption of Multi-Operator Evolutionary Algorithms and Intelligent Vans Capable of Reporting Real-Time Incidents," in IEEE Transactions on Automation Science and Engineering, vol. 14, No. 2, pp. 1009-1019, Apr. 2017 (Year: 2017).*

(Continued)

*Primary Examiner* — Matthew Mikels
(74) *Attorney, Agent, or Firm* — Sughrue Mion, PLLC (57) ABSTRACT

A delivery monitoring device includes: a reading unit that reads a tag signal transmitted by a tag signal transmission device, the tag signal transmission device being attached to a package located in a vicinity of the delivery monitoring device; an acquisition unit that acquires position information indicating a position of the delivery monitoring device; and a transmission unit that transmits management information including the tag signal and the position information, to a delivery management server.

9 Claims, 4 Drawing Sheets

(51) Int. Cl.
    *G06Q 50/28*  (2012.01)
    *H04W 4/029*  (2018.01)

(56) References Cited

FOREIGN PATENT DOCUMENTS

| | | |
|---|---|---|
| JP | 2013-166597 A | 8/2013 |
| JP | 2015-124052 A | 7/2015 |
| JP | 2016-155674 A | 9/2016 |
| JP | 2016-170849 A | 9/2016 |
| JP | 2017-039601 A | 2/2017 |
| JP | 2018-018195 A | 2/2018 |

OTHER PUBLICATIONS

International Search Report for PCT/JP2019/010903 dated Jun. 11, 2019 [PC/ISA/210].
Written Opinion for PCT/JP2019/010903 dated Jun. 11, 2019 [PC/ISA/237].

* cited by examiner

DELIVERY MONITORING DEVICE, DELIVERY MANAGEMENT METHOD, RECORDING MEDIUM

CROSS REFERENCE TO RELATED APPLICATIONS

This application is a National Stage of International Application No. PCT/JP2019/010903 filed Mar. 15, 2019, claiming priority based on Japanese Patent Application No. 2018-063702 filed Mar. 29, 2018.

TECHNICAL FIELD

The present invention relates to a delivery monitoring device, a delivery management method, and a recording medium.

BACKGROUND ART

Packages that are delivered via multiple collection sites are inspected at each collection site and registered in a database or the like. In this way, it is possible to manage which collection sites the packages have reached. Related art is disclosed in Patent Document 1. Patent Document 1 discloses a technology in which a wireless communication device provided on a delivery vehicle or in a warehouse receives information from wireless tags appended to packages and transmits the information to a server on the internet.

Prior Art Documents

Patent Documents

[Patent Document 1]
Japanese Unexamined Patent Application, First Publication No. 2001-328713

SUMMARY OF THE INVENTION

Problem to be Solved by the Invention

In order to track packages, a method in which a wireless communication device as described in Patent Document 1 is mounted on each delivery vehicle might be contemplated. However, there can be expected to be situations in which a wireless communication device cannot be mounted on a delivery vehicle. For example, when the delivery company outsources deliveries to a transportation company, it is difficult to pre-install equipment for tracking mailed articles in delivery vehicles, such as trucks, that are owned by the transportation company. A way to easily monitor packages even in such situations is sought.

Thus, an object of the present invention is to provide a delivery monitoring device, a delivery management method, and a recording medium that can solve the above-mentioned problem.

Means for Solving the Problem

According to a first example aspect of the present invention, a delivery monitoring device includes: a reading unit that reads a tag signal transmitted by a tag signal transmission device, the tag signal transmission device being attached to a package located in a vicinity of the delivery monitoring device; an acquisition unit that acquires position information indicating a position of the delivery monitoring device; and a transmission unit that transmits management information including the tag signal and the position information, to a delivery management server.

According to a second example aspect of the present invention, a delivery management method includes: reading, by a delivery monitoring device, a tag signal transmitted by a tag signal transmission device, the tag signal transmission device being attached to a package located in a vicinity of the delivery monitoring device; acquiring, by a delivery monitoring device, position information indicating a position of the delivery monitoring device; and transmitting, by a delivery monitoring device, management information including the tag signal and the position information, to a delivery management server.

According to a third example aspect of the present invention, a recording medium stores a program that causes a computer in a delivery monitoring device to execute: reading a tag signal transmitted by a tag signal transmission device, the tag signal transmission device being attached to a package located in a vicinity of the delivery monitoring device; acquiring position information indicating a position of the delivery monitoring device; and transmitting management information including the tag signal and the position information, to a delivery management server.

Effect of the Invention

According to an example embodiment of the present invention, the position of a package that is delivered via a collection site can be easily recognized even in a case in which a wireless device for exchanging information of the package with a server for managing deliveries is not mounted on a package carrier such as a delivery vehicle.

EXAMPLE EMBODIMENTS FOR CARRYING OUT THE INVENTION

Hereinbelow, a delivery management system 100 according to an example embodiment of the present invention will be explained with reference to the drawings.

Figure 1:
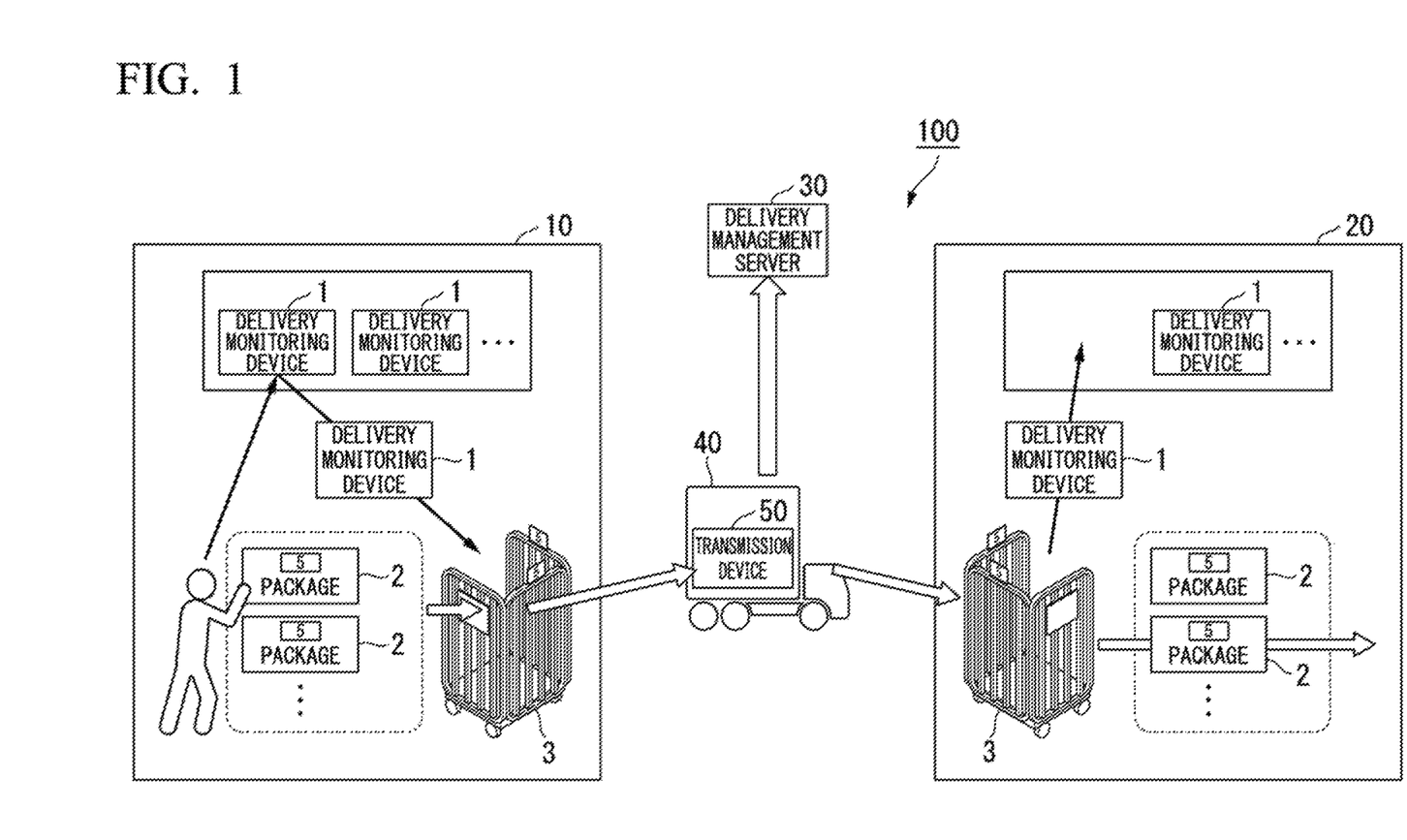
FIG. 1 is a diagram schematically illustrating a delivery management system according to an example embodiment of the present invention.

FIG. 1 is a diagram schematically illustrating a delivery management system 100 according to the present example embodiment.

The delivery management system 100 includes a delivery monitoring device 1 and a delivery management server 30.

The delivery monitoring device 1, which has a portable form and a portable size, is loaded on a truck 40 or the like together with a package 2 and is delivered to a delivery destination. The truck 40 is one form of a carrier. A worker working at a delivery source collection site 10 puts one or a plurality of packages 2 and a delivery monitoring device 1 inside a pallet 3. The worker loads the pallet 3 (structure) containing the packages 2 and the delivery monitoring device 1 into the truck 40. A driver drives the truck 40 so as to travel from the delivery source collection site 10 to a delivery destination collection site 20. A worker at the delivery destination collection site 20 unloads the pallet 3 from the truck 40 and performs work to deliver the package 2 to the next collection site or delivers the package 2 to a residence or the like that is the final delivery destination.

In such a delivery management system 100, an IC tag 5 is attached to each package 2. Additionally, an IC tag 5 is also attached to the pallet 3. The IC tags 5 emit tag signals including tag IDs while the packages 2 are being delivered by the truck 40. The tag signals are received by the delivery monitoring device 1 that is being delivered together with the packages 2. The delivery monitoring device 1 transmits, to the delivery management server 30, management information including tag IDs and position information received during delivery, while being delivered by the truck 40 and when arriving at the delivery destination collection site 20. Thus, the delivery management server 30 can recognize the position at which each package is located.

The delivery monitoring device 1 is provided on a dedicated charging rack provided at the delivery source collection site 10 and the delivery destination collection site 20. The delivery monitoring device 1 is charged by being connected to a power source in the charging rack when not being delivered together with the package 2.

Figure 2:
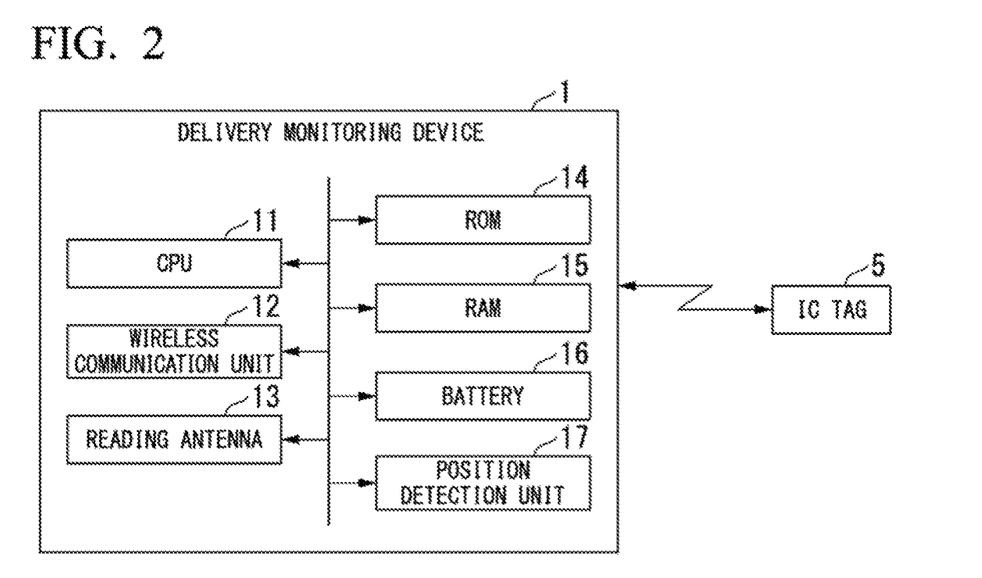
FIG. 2 is a hardware structure diagram of a delivery monitoring device according to the example embodiment of the present invention.

FIG. 2 is a diagram illustrating the hardware structure of the delivery monitoring device 1.

The delivery monitoring device 1 includes a CPU (Central Processing Unit) 11, a wireless communication unit 12, a reading antenna 13, a ROM (Read Only Memory) 14, a RAM (Random Access Memory) 15, a battery 16, a position information detection unit 17, and the like. The wireless communication unit 12 communicably connects with the delivery management server 30 via a base station device in a cellular telephone network or the like. The reading antenna 13 receives tag signals transmitted by the IC tags 5. The IC tags 5 in the present example embodiment are activated based on wireless signals transmitted from the reading antenna 13 in the delivery monitoring device 1 and transmit tag signals including tag IDs stored therein. The position information detection unit 17 may detect the current position by receiving signals from a GPS satellite, or may detect the current position based on signals received from multiple base stations in a cellular telephone network. The current position is a latitude and a longitude.

Figure 3:
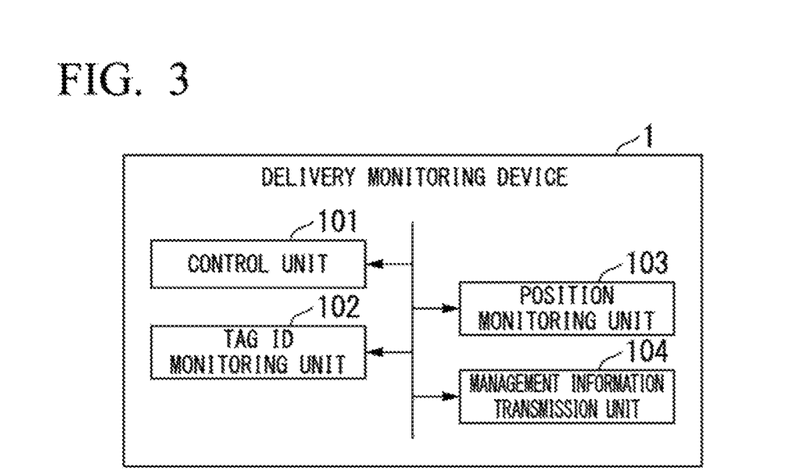
FIG. 3 is a functional block diagram of the delivery monitoring device according to the example embodiment of the present invention.

FIG. 3 is a diagram illustrating functional blocks of the delivery monitoring device 1.

The CPU 11 of the delivery monitoring device 1, after being activated, runs a delivery monitoring program. As a result thereof, the delivery monitoring device 1 is able to perform the functions of a control unit 101, a tag ID monitoring unit 102, a position monitoring unit 103, a management information transmission unit 104, and the like.

The control unit 101 controls the other functional units.

The tag ID monitoring unit 102 manages the tag ID information included in the tag signals received from the IC tags 5.

The position monitoring unit 103 acquires and manages position information detected by the position information detection unit 17.

The management information transmission unit 104 transmits management information, including tag IDs and position information, to the delivery management server 30.

Figure 4:
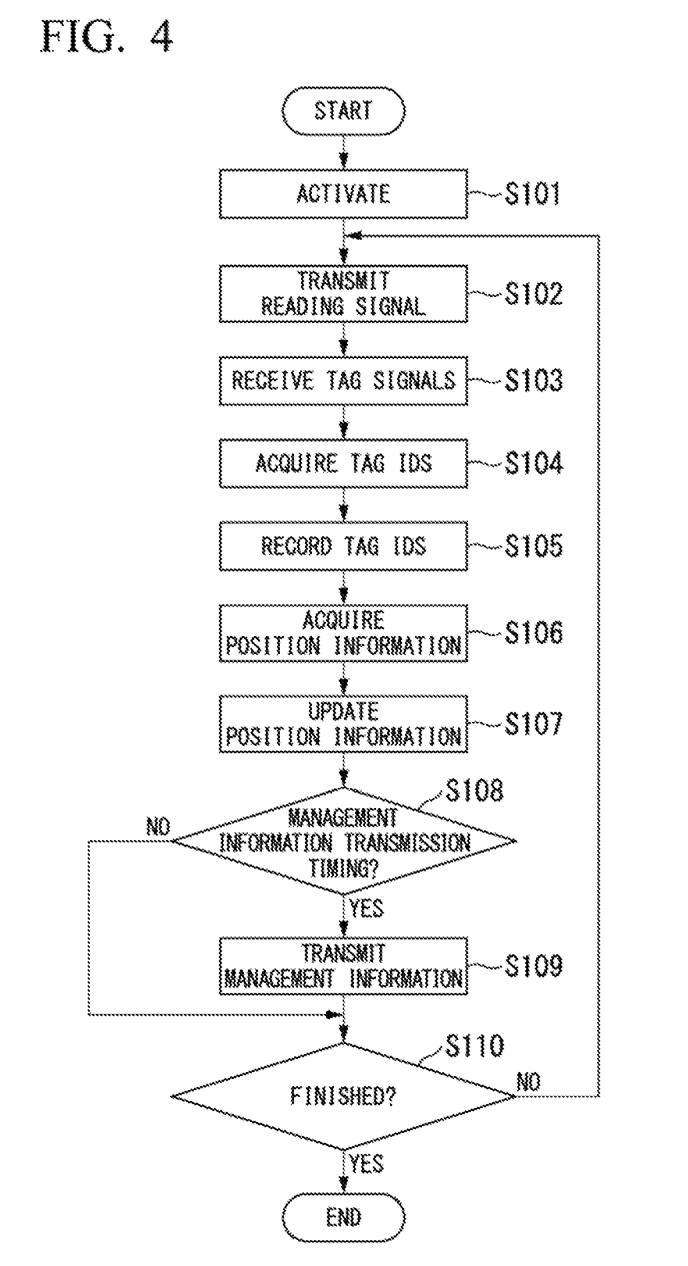
FIG. 4 is a diagram illustrating the processing flow in the delivery monitoring device according to the example embodiment of the present invention.

FIG. 4 is a diagram illustrating the processing flow in the delivery monitoring device 1.

Next, the process in the delivery monitoring device 1 will be explained.

When the delivery monitoring device 1 is put in the pallet 3 together with the packages 2 and loaded onto the truck 40, its power is turned on. Then, the delivery monitoring device 1 is activated (step S101). As a result thereof, until being delivered to the delivery destination by the truck 40, the delivery monitoring device 1 transmits, from the reading antenna 13, reading signals of a prescribed frequency after being activated (step S102). The transmission of reading signals may be at prescribed intervals. The IC tags 5 appended to the packages 2 and the pallet 3 receive the reading signals. The IC tags 5 are activated by electric current flowing in resonance circuits based on the frequencies of the reading signals, and transmit tag signals including pre-stored tag IDs. The tag IDs stored in the IC tags 5 appended to the packages 2 and the pallet 3 are different from each other. The reading antenna 13 receives the tag signals (step S103). The tag ID monitoring unit 102 acquires the tag IDs contained in the tag signals (step S104). The tag ID monitoring unit 102 records the acquired tag IDs in a storage unit such as the RAM 15 (step S105).

Multiple pallets 3 containing multiple packages may be loaded in the truck 40. It is sufficient for at least one delivery monitoring device 1 to be loaded on the cargo bed of a single truck 40. Multiple delivery monitoring devices 1 may be loaded on the cargo bed of a single truck 40. When multiple packages 2 or multiple pallets 3 are loaded in the truck 40, the delivery monitoring device 1 may sometimes receive multiple tag signals at the same time. In such a case, the delivery monitoring device 1 cannot acquire the tag IDs included in the tag signals. However, the delivery monitoring device 1 and the IC tags 5 includes functions for avoiding the non-detection of tag IDs in the delivery monitoring device 1 when such collisions of tag signals have occurred. For example, the non-detection of tag IDs in the delivery monitoring device 1 may be avoided by the IC tags 5 performing transmission with the interval from the reception of the reading signal to the transmission of the tag signal being changed. Alternatively, the non-detection of tag IDs in the delivery monitoring device 1 may be avoided by another method. Known techniques may be used in the method of avoiding the non-detection of tag IDs in the delivery monitoring device 1.

In parallel with the above-mentioned acquisition of tag IDs, the position monitoring unit 103 acquires position information from the position information detection unit 17 (step S106). The position monitoring unit 103 records the acquired position information in a storage unit such as the RAM 15. The position monitoring unit 103 acquires position information from the position information detection unit 17 at prescribed intervals and updates the position information recorded in the storage unit (step S107). As a result thereof, the delivery monitoring device 1 always stores the newest current position information.

The management information transmission unit 104 determines a transmission timing of the management information (step S108). The management information transmission unit 104, when the transmission timing of the management information arrives, generates management information including all of the tag IDs that are stored and the newest current position information. The management information transmission unit 104 transmits the management information to the delivery management server 30 via a base station of a cellular telephone network or the like (step S109). The control unit 101 in the delivery monitoring device 1 determines whether the process is finished until the truck 40 arrives at the delivery destination collection site 20 and the power is turned off (step S110). If the process is not finished, then the above-mentioned process is repeated. As a result thereof, the delivery monitoring device 1 repeatedly transmits management information to the delivery management server 30.

The delivery management server 30 receives the management information. The delivery management server 30 acquires the tag IDs and the position information from the management information. The delivery management server 30 stores the tag IDs and the position information with being linked, in a delivery management table. The delivery management server 30 repeatedly receives the management information. When a tag ID is received again, the delivery management server 30 updates the past position information that is recorded with being linked to that tag ID with the position information included in the newly received management information. Thus, tag IDs and the newest position information of packages 2 or pallets 3 to which those tag IDs are appended can be stored in the delivery management server 30.

According to the above process, simply by transporting a portable delivery monitoring device 1 with being contained in a pallet 3 together with packages 2, the delivery management server 30 can monitor which packages 2 and pallets 3 corresponding to tags are located at which positions, without mounting wireless devices or the like on a carrier such as a truck 40. The carrier is not limited to being a truck 40. For example, it may be a flying vehicle such as a drone.

Various determination methods may be contemplated for determining whether the management information transmission timing has arrived in the above-mentioned step S108.

As one example, the management information transmission unit 104 may determine that the management information is to be transmitted when a button provided in the delivery monitoring device 1 is pressed.

Alternatively, the management information transmission unit 104 may store list data of tag IDs corresponding to the respective packages that are to be delivered, and may determine that the management information is to be transmitted when all of the tag IDs or a certain proportion of the tag IDs recorded in this list data have been recorded based on the reception of the tag signals. This list data may be transmitted to the delivery monitoring device 1 by the delivery management server 30. The delivery management server 30 may perform processes for deleting or updating the list data stored in the delivery monitoring device 1 each time the delivery monitoring device 1 is delivered.

Alternatively, the delivery monitoring device 1 may include a light-detecting sensor, the light-detecting sensor detecting that the door of the truck 40 has been opened when the amount of light becomes a prescribed threshold value or higher, and the management information transmission unit 104 may determine that the management information is to be transmitted when a signal indicating that the door has been opened is received. In this case, the management information is transmitted when the door of the truck 40 is opened at the delivery destination collection site 20.

Alternatively, the delivery monitoring device 1 may receive an opening/closing signal indicating the opening or closing of the door of the truck 40 from an opening/closing signal transmission device (transmission request device) 50 (see FIG. 1) provided on the door of the truck 40 or the like, and the management information transmission unit 104 may determine that the management information is to be transmitted when an opening signal (transmission request signal) indicating that the door has opened is received. In this case, the management information is transmitted when the door of the truck 40 is opened at the delivery destination collection site 20 or the like.

Figure 5:
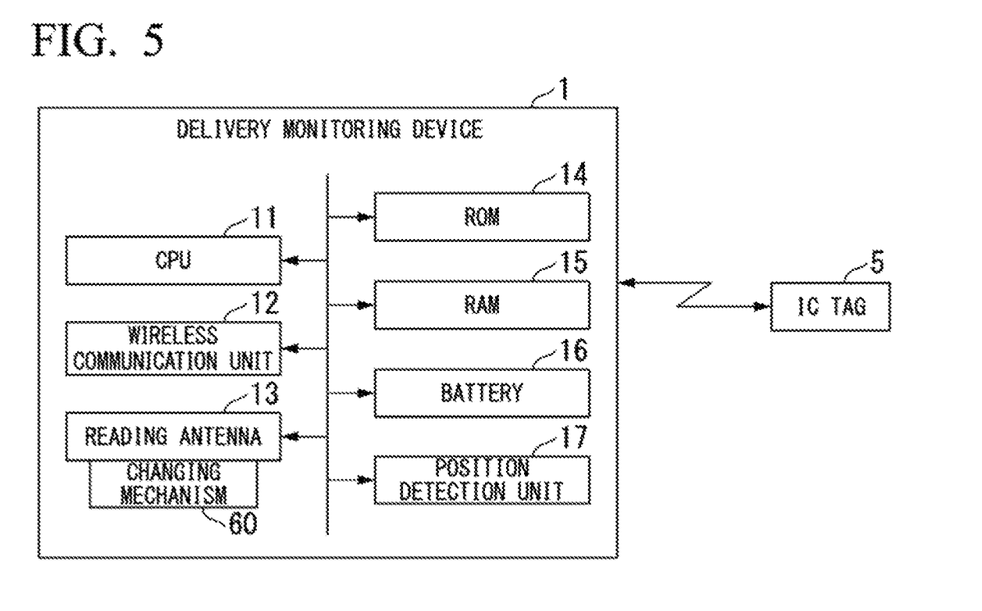
FIG. 5 is a diagram illustrating a modified example of the hardware structure of the delivery monitoring device illustrated in FIG. 2.

Here, it is preferable that the reading antenna 13 in the delivery monitoring device 1 be configured so as to be able to read the tag signals at various positions in the truck 40 while being delivered by the truck 40. For this reason, for example, multiple reading antennas 13 may be provided in the respective directions so as to have directionality in various orientations in three-dimensional space relative to the delivery monitoring device 1. Additionally, for example, as indicated in FIG. 5, a singe or multiple antennas that are attached to the delivery monitoring device 1 may be mounted on a reading direction changing mechanism (changing mechanism) 60 that changes the reading direction. For example, the reading direction changing mechanism 60 may include a mechanism that changes the orientation of the reading direction of the antenna such as by rotating about an attaching shaft to the delivery monitoring device 1 based on the change in gravitational force or vibrations. By being provided with such a reading direction changing mechanism 60, the delivery monitoring device 1 can receive tag signals transmitted by multiple IC tags 5 inside a carrier such as a truck 40.

Figure 6:
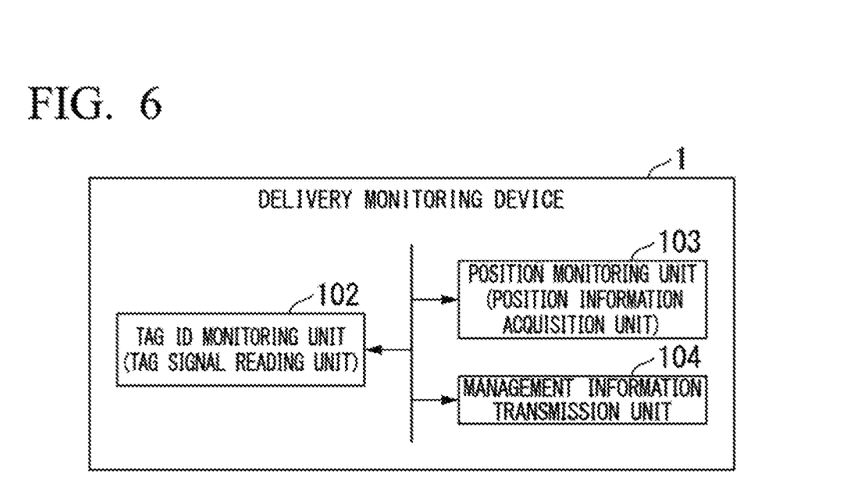
FIG. 6 is a diagram illustrating the structure of a delivery monitoring device according to another example embodiment of the present invention.

FIG. 6 is a diagram illustrating the structure of a delivery monitoring device according to another example embodiment of the present invention.

The delivery monitoring device 1 may include at least a tag ID monitoring unit 102, which corresponds to a tag signal reading unit (reading unit), a position monitoring unit 103, which corresponds to a position information acquisition unit (acquisition unit), and a management information transmission unit (transmission unit) 104.

The tag ID monitoring unit 102, after being activated, reads tag signals transmitted by the IC tags (tag signal transmission devices) attached to packages located in the vicinity.

The position monitoring unit 103, after being activated, acquires position information.

The management information transmission unit 104 transmits, to the delivery management server 30, management information including tag signals and position information.

The above-mentioned delivery monitoring device has a computer system in the interior thereof. Furthermore, the steps in the above-mentioned processes are stored in the form of a program on a computer-readable recording medium, and the above-mentioned processes are performed by a computer reading and running this program. Here, a computer-readable recording medium refers to a magnetic disk, a magneto-optic disk, a CD-ROM, a DVD-ROM, a semiconductor memory device or the like. Additionally, this computer program may be distributed to a computer by means of a communication line and the program may be run by the computer that has received the distributed program.

Additionally, the above-mentioned program may be for realizing just some of the aforementioned functions.

Furthermore, it may be a so-called difference file (difference program) that can be realized by being combined with a program in which the aforementioned functions are already recorded on a computer system.

This application is based upon and claims the benefit of priority from Japanese Patent Application No. 2018-063702, filed Mar. 29, 2018, the disclosure of which is incorporated herein in its entirety.

INDUSTRIAL APPLICABILITY

The present invention may be applied to a delivery monitoring device, a delivery management method, and a recording medium.

REFERENCE SYMBOLS

1 Delivery monitoring device
101 Control unit
102 Tag ID monitoring unit
103 Position monitoring unit
104 Management information transmission unit
2 Package
3 Pallet
5 IC tag
30 Delivery management server
40 Truck

The invention claimed is:
1. A delivery monitoring device comprising:
a memory configured to store instructions; and
a processor configured to execute the instructions to:
acquire a tag signal transmitted by a tag signal transmission device, the tag signal transmission device being attached to a package located in a vicinity of the delivery monitoring device;
acquire position information indicating a position of the delivery monitoring device;
receive a signal that indicates opening of a door of a carrier when an amount of light is a prescribed threshold value or higher, the carrier containing the delivery monitoring device; and
cause a transmitter to transmit management information including the tag signal and the position information, to a delivery management server, in response to the signal that indicates the opening of the door of the carrier being received,
wherein acquiring the tag signal comprises acquiring a plurality of tag signals from a plurality of tag transmission devices, each of the plurality of tag signal transmission devices performing transmission with an interval from reception of a reading signal to transmission of the tag signal being changed.

2. The delivery monitoring device according to claim 1, further comprising:
an antenna that receives the tag signal; and
a changing mechanism that, by changing an orientation of the antenna, changes a direction in which the antenna reads a signal.

3. The delivery monitoring device according to claim 1, wherein the processor is configured to execute the instructions to acquire a tag signal transmitted by a tag signal transmission device attached to a structure containing the package, and
causing the transmitter to transmit the management information comprises causing the transmitter to transmit, as the management information, information including the tag signal transmitted by the tag signal transmission device attached to the package, the tag signal transmitted by the tag signal transmission device attached to the structure, and the position information, to the delivery management server.

4. A delivery management method comprising:
acquiring, by a delivery monitoring device, a tag signal transmitted by a tag signal transmission device, the tag signal transmission device being attached to a package located in a vicinity of the delivery monitoring device;
acquiring, by the delivery monitoring device, position information indicating a position of the delivery monitoring device;
receiving a signal that indicates opening of a door of a carrier when an amount of light is a prescribed threshold value or higher, the carrier containing the delivery monitoring device; and
transmitting, by the delivery monitoring device, management information including the tag signal and the position information, to a delivery management server, in response to the signal that indicates the opening of the door of the carrier being received,
wherein acquiring the tag signal comprises acquiring a plurality of tag signals from a plurality of tag transmission devices, each of the plurality of tag signal transmission devices performing transmission with an interval from reception of a reading signal to transmission of the tag signal being changed.

5. A non-transitory computer-readable recording medium storing a program that causes a computer in a delivery monitoring device to execute:
acquiring a tag signal transmitted by a tag signal transmission device, the tag signal transmission device being attached to a package located in a vicinity of the delivery monitoring device;
acquiring position information indicating a position of the delivery monitoring device; and
receiving a signal that indicates opening of a door of a carrier when an amount of light is a prescribed threshold value or higher, the carrier containing the delivery monitoring device; and
transmitting management information including the tag signal and the position information, to a delivery management server, in response to the signal that indicates the opening of the door of the carrier being received,
wherein acquiring the tag signal comprises acquiring a plurality of tag signals from a plurality of tag transmission devices, each of the plurality of tag signal transmission devices performing transmission with an interval from reception of a reading signal to transmission of the tag signal being changed.

6. The delivery monitoring device according to claim 1, wherein the delivery monitoring device has a portable form and is loaded on the carrier together with the package.

7. The delivery monitoring device according to claim 1, wherein a tag signal transmission device is attached to a pallet, and
the processor is configured to execute the instructions to acquire a tag signal transmitted by the tag signal transmission device attached to the pallet.

8. The delivery monitoring device according to claim 1, wherein the processor is configured to execute the instructions to:
detect the light; and
detect that the door has been opened when the amount of the light is the prescribed threshold value or higher.

9. The delivery monitoring device according to claim 1, wherein the carrier is a truck, and receiving the signal that indicates the opening of the door comprises receiving the signal that indicates the opening of the door from an opening/closing signal transmission device provided on the door of the truck.

* * * * *